Figure 1:
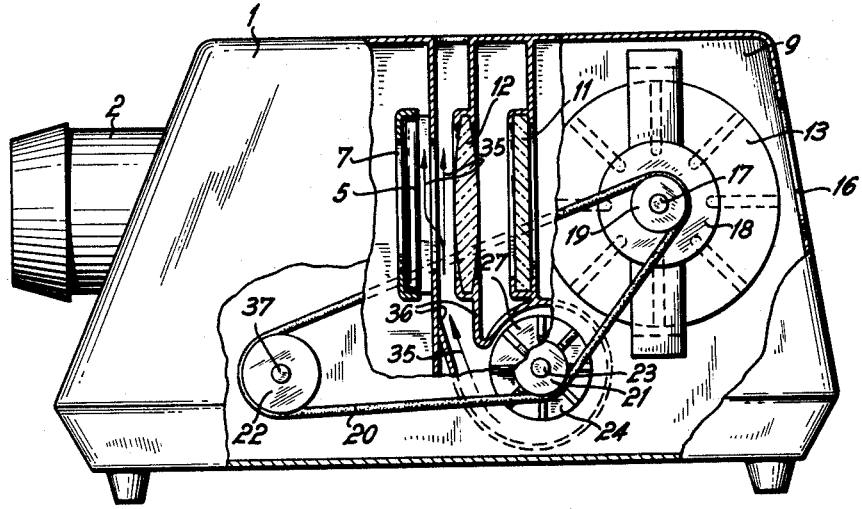

Oct. 13, 1964   E. ZILLMER   3,152,509
VENTILATING ARRANGEMENT FOR SLIDE PROJECTORS
Filed Nov. 13, 1961

INVENTOR
ERICH ZILLMER
By Blum, Moscovitz,
Friedman and Blum
Attorneys

United States Patent Office 3,152,509
Patented Oct. 13, 1964

3,152,509
VENTILATING ARRANGEMENT FOR SLIDE PROJECTORS
Erich Zillmer, Braunschweig, Germany, assignor to Voigtlander A.G., Braunschweig, Germany, a corporation of Germany
Filed Nov. 13, 1961, Ser. No. 151,968
Claims priority, application Germany, Nov. 23, 1960, Z 8,384
3 Claims. (Cl. 88—28)

This invention relates to slide projectors and, more particularly, to novel and improved ventilating means for slide projectors.

The intense heat output of the lamps of high power slide projectors requires the installation of forced air flow ventilating means to cool the projector lamp, the illuminating optical system, slides seated in the projector, and other parts of the projector. For this purpose, arrangements have been provided involving a mechanical ventilating device, such as a fan or blower, whose air flow is channeled by means of baffles or ducts to those portions of the projector which require cooling. Since such portions are at varying distances from the ventilating fan, the cooling air has to travel varying distances before it is in effective cooling relation with a particular portion of the projector. As a consequence, the speed of air flow may be decreased, and the air may be appreciably heated, by baffles along the flow path and which are heated by the projector lamp, so that the air reaching parts of the projector spaced considerably from the ventilating fan, or having to flow past such baffles heated by the projector lamp before reaching the portion intended to be cooled, is already warmed so that its cooling effect is greatly decreased.

In accordance with the present invention, the disadvantageous features of known ventilating devices for slide projectors are obviated, and effective cooling, particularly of a slide in the projector and exposed directly to the rays of the projector lamp, is effected. As a further feature, the invention includes a simple means to direct warm air to the slide magazine to preheat slides to a temperature approaching that of the interior of the projector, and to expand the slides, before the slides are positioned in the projector. The invention ventilating arrangement is applicable both to projectors provided with mechanical or automatic slide changing devices and to projectors in which the slides are arranged to be changed manually.

More particularly, the ventilating means of the present invention comprises plural ventilating means, such as fans or blowers, driven by a common transmission, at least one of the ventilating means being associated with the housing of the projector lamp, while the other ventilating means are associated with the slide window and the illuminating optical system. Furthermore, a further ventilating means may by provided to draw warm air from the projector lamp housing and direct it to the slides stacked in a magazine.

Figure 2:
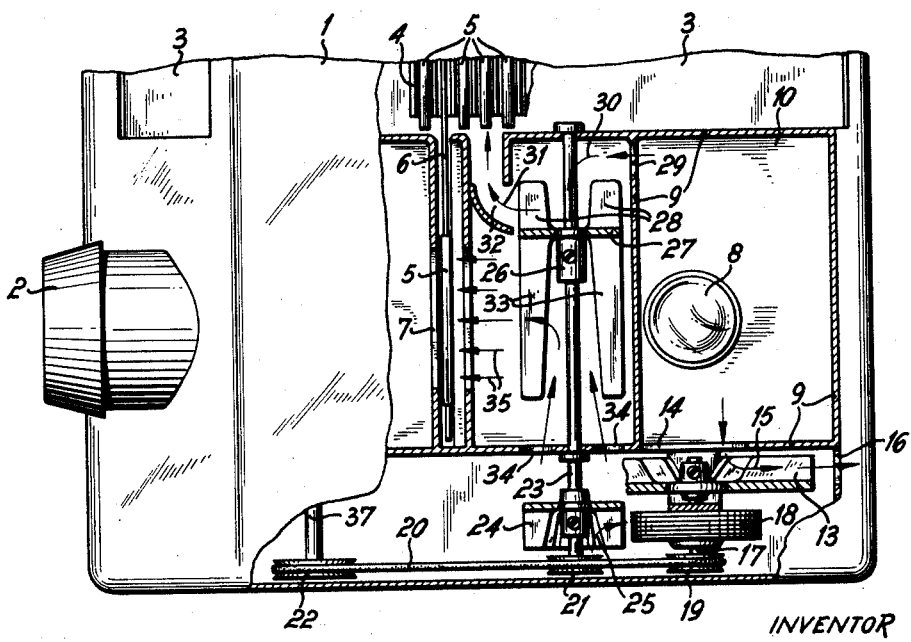

For an understanding of the principles of the invention, reference is made to the following description of a typical embodiment thereof as illustrated in the accompanying drawings. In the drawings:

FIG. 1 is a side elevational view of a slide projector embodying the invention, partly in section and with a side wall and an internal partition partly broken away, and FIG. 2 is a partial view of the projector shown in FIG. 1, partly in section and with the top wall partly broken away.

Referring to the drawings, the slide projector illustrated therein comprises a housing or casing 1 having an object lens 2 mounted thereon and provided with compartment 3 parallel to the optical axis of the objective lens and arranged to receive a magazine 4 containing slides 5. In a known manner, slides 5 can be moved sequentially from magazine 4 to the slide window 7 of the projector and then returned to magazine 4 by means of a mechanically or manually operated slide changer 6.

Slide window 7 is positioned between objective lens 2 and projection lamp 8, which latter is mounted in a lamp chamber 10 enclosed by walls 9. As best seen in FIG. 1, an illuminating optical system is provided and may consist of a heat insulating filter 11 and a condensing lens 12 positioned between projector lamp 8 and slide window 7.

Heat generated by projector lamp 8 is extracted from lamp chamber 10 by an air current drawn through an opening 14 by a fan or blower 13. As indicated by the arrow 15, the warm air thus extracted from chamber 10 is forced out of the projector housing through an opening 16. Fan 13 is secured to the shaft 17 of an electric motor 18, and shaft 17 also has a pulley 19 secured thereon. By means of endless driving means, such as a rope 20 or the like, electric motor 18 is effective to drive other pulleys 21 and 22.

Pulley 21 is secured to a shaft 23 having also secured thereto a fan or blower 24. The air flow produced by fan or blower 24 is directed to electric motor 18, as indicated by the arrow 25. There is also secured to the shaft 23 a second fan 26 divided into two fan sections, 28 and 33 by a diametrically extending disk or partition 27. The fan blades 28 on one side of the disk or partition 27 aspirate warm air from lamp chamber 10 through an aperture 29, and this warm air is directed through a duct 32, as indicated by the arrows 30 and 31, to slides 5 in magazine 4. By this means, unvitrified slides in the magazine are preheated and expanded.

The fan blades 33 on the opposite side of diametrically extending disk or partition 27 aspirate relatively cool air through openngs 34 and, as indicated by the arrows 35, this air is then directed to a slide 5 positioned in slide window 7 to cool the slide to protect it against damage by the heat of the projector lamp. This air stream flows between baffles 36 forming part of the enclosure for the fan 26, and leading to the slide window 7. This air stream also cools the illuminating optical system 12, as best seen in FIG. 1.

Pulley 22 is secured to a shaft 37 which is coupled to a control mechanism for shifting the slides, and to a magazine carrier, this mechanism and the carrier being of any old and well known construction.

The particular advantages of the invention arrangement reside primarily in the short and properly oriented ducts for the warm air, as indicated by arrows 15, 30, and 31, as well as the short ducts for the cooler air. Additionally, there is an advantage in having two ventilators or fans mounted on a common shaft, such as ventilators 24 and 26. Finally, a single drive motor drives all three ventilators.

Since the stream of air warm for warming the slides in the magazine is required only when unvitrified slides are used, and since the quantity of such warm air may additionally vary in accordance with the output of the projector lamp, it is advantageous to utilize an adjustable shutter either at aperture 29 or in the duct 32.

While a specific embodiment of the invention has been shown and described in detail in order to illustrate the application of the principles of the invention, it will be understood that the invention may be embodied otherwise without departing from such principles.

What is claimed is:

1. In a slide projector having a housing including a projector lamp compartment, apertured partition means forming a slide window, an illuminating optical system arranged along the optical axis of the projector, and a slide compartment extending parallel to the optical axis: a ventilating arrangement comprising first, second and third rotary blowers having their shafts arranged in substantially horizontal parallel relation and extending transversely of the optical axis; a single driving means; a common drive connection between said driving means and all of said shafts; said first rotary blower being positioned and arranged to withdraw heated air from said lamp compartment and to discharge said heated air outwardly of the projector; said second rotary blower being positioned between the lamp compartment and the slide window, and being disposed at an elevation below the slide window; said second rotary blower including a rotor which is subdivided axially by a diametrically extending disk to provide a first rotor section and a second rotor section; said first rotor section having an axial length substantially equal to the lateral extent of the slide window and being substantially coextensive laterally therewith, and said second rotor section being disposed between said first rotor section and said lamp compartment; said first rotor section drawing cool air from outside the housing and directing such cool air through the slide window; said second rotor section withdrawing heated air from said lamp compartment; and means associated with said second rotor section for directing the heated air withdrawn from the lamp compartment into the slide compartment to heat and expand unvitrified slides in a magazine in said slide compartment and then to discharge the air to the exterior of the projector housing; said third rotary blower being positioned and arranged to direct cooling air over said driving means; said second and third rotary blowers being mounted on a common drive shaft.

2. In a slide projector having a housing including a projector lamp compartment, apertured partition means forming a slide window, an illuminating optical system arranged along the optical axis of the projector, and a slide magazine compartment extending parallel to the optical axis along one side of the projector: a ventilating arrangement comprising a substantially vertical interior partition wall extending parallel to the optical axis along the opposite side of the projector and formed with an aperture into the lamp compartment at substantially the height of the optical axis; first, second and third rotary blowers having their shafts arranged in substantially horizontal parallel relation and extending transversely of the optical axis; an electric motor; a driving pulley rotatable by said electric motor; driven pulley means associated with said rotary blowers; an endless flexible transmission element trained over said driving pulley and said driven pulley means, said first rotary blower being rotatable directly by said motor and positioned and arranged to withdraw heated air from said lamp compartment through the aperture in said partition wall and to discharge the heated air outwardly from said projector; said second and third rotary blowers having a common shaft rotatably mounted in said projector; said driven pulley means comprising a driven pulley secured to said common shaft; said second rotary blower being mounted externally of said partition wall and positioned and arranged to direct cooling air flow over said motor; said third rotary blower being positioned laterally between said partition wall and said slide compartment, and vertically at an elevation below said slide window; said third rotary blower including a rotor secured to said common shaft and a diametrically extending partition positioned to subdivide said rotor into a first rotor section and a second rotor section; said first rotor section having an axial extent substantially equal to the lateral extent of said slide window and being substantially coextensive laterally with said slide window, and said second rotor section being positioned between said first rotor section and said slide compartment; said first rotor section drawing cool air from outside the projector housing and directing it through said slide window; said second rotor section withdrawing heated air from said lamp compartment; and means for directing the heated air drawn from said lamp compartment by said second rotor section into said slide compartment to pre-heat and expand unvitrified slides in a magazine in said slide compartment and then to discharge the air out of the projector housing.

3. In a slide projector having a housing including a projector lamp compartment, apertured partition means forming a slide window, an illuminating optical system arranged along the optical axis of the projector, and a slide compartment extending parallel to the optical axis along one side of the projector: a ventilating arrangement comprising a substantially vertical interior partition wall extending parallel to the optical axis along the opposite side of the projector and formed with an aperture into the lamp compartment at substantially the height of the optical axis; first, second and third rotary blowers having their shafts arranged in substantially horizontal parallel relation and extending transversely of the optical axis; a single driving means connected in driving relation with all of said rotary blowers; said first rotary blower being positioned externally of said partition wall and arranged to withdraw heated air from the lamp compartment through said aperture and to discharge the withdrawn air from the projector housing; said second blower being positioned between the lamp compartment and the slide window, and at an elevation below the slide window, and including a rotor divided into rotor sections by a diametrically extending partition; said first rotor section having an axial extent substantially equal to the lateral extent of the slide window and being laterally substantially coextensive therewith; said first rotor section drawing cool air from outside the housing and directing it through the slide window; said second rotor section being positioned between said first rotor section and said slide compartment, and withdrawing heated air from the lamp compartment; and means operable to direct the heated air withdrawn by said second rotor section from the lamp compartment into the slide compartment and over slides positioned in a magazine in the slide compartment, to preheat and expand unvitrified slides in the magazine, and then to direct the air out of the projector housing; said third rotor blower being mounted on the same shaft with said second rotary blower and positioned externally of said partition wall to direct cooling air against said driving means.

References Cited in the file of this patent

UNITED STATES PATENTS

| | | |
|---|---|---|
| 1,286,662 | Larsen et al. | Dec. 3, 1918 |
| 1,489,332 | Outrey | Apr. 8, 1924 |
| 1,814,269 | Terry | July 14, 1931 |
| 2,705,437 | Lessman | Apr. 5, 1955 |
| 2,949,815 | Rosenberger et al. | Aug. 23, 1960 |
| 3,014,297 | Robinson et al. | Dec. 26, 1961 |